July 12, 1949.
G. WHITE ET AL
2,476,169
METHOD AND MEANS FOR SUPPORTING
GLASS SHEETS DURING BENDING
Filed Dec. 26, 1947
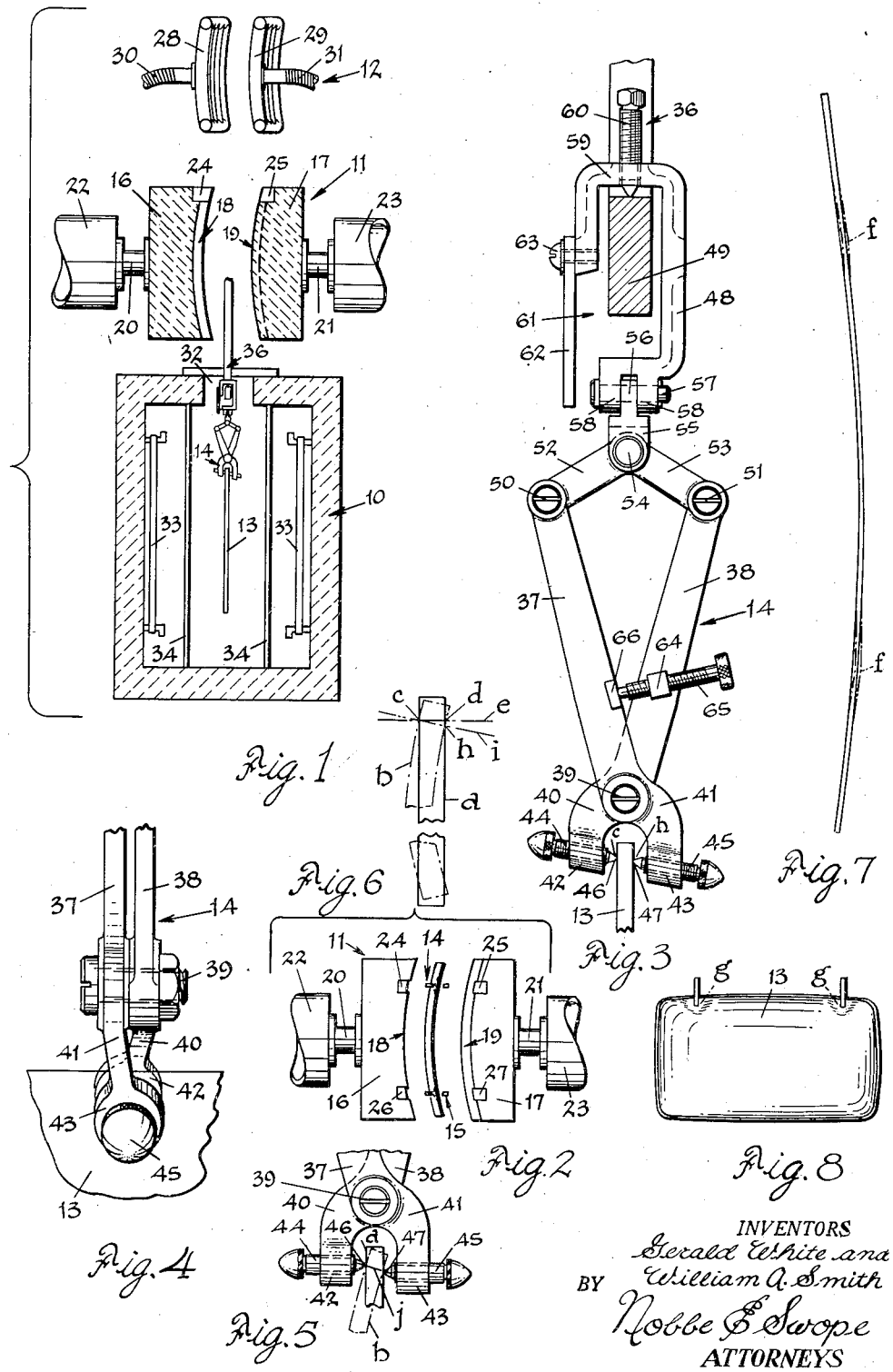
INVENTORS
Gerald White and
William A. Smith
BY Nobbe & Swope
ATTORNEYS Patented July 12, 1949

2,476,169

UNITED STATES PATENT OFFICE 2,476,169

METHOD AND MEANS FOR SUPPORTING GLASS SHEETS DURING BENDING

Gerald White, Rossford, and William A. Smith, Toledo, Ohio, assignors to Libbey-Owens-Ford Glass Company, Toledo, Ohio, a corporation of Ohio Application December 26, 1947, Serial No. 794,054

14 Claims. (Cl. 49—87)

The present invention relates to the art of bending glass sheets or plates and more particularly to an improved method of and means for suspending the said sheet or plate in a vertical position during bending.

While the invention is not limited to use in the bending of glass sheets which are to be subsequently tempered, it is of especial utility when employed in processing bent tempered glass and will therefore be illustrated in the drawings and hereinafter described in connection with such a process, although it will be understood that the glass sheet, after bending, can be slowly annealed rather than tempered if preferred.

In the tempering of glass sheets according to one known process, the sheets are first heated to approximately the point of softening of the glass and then suddenly cooled to place the outer surfaces of said sheets under compression and the interiors thereof under tension. The treatment of the sheets in this manner not only materially increases the mechanical strength of the glass but further modifies its breaking characteristics in that when broken the glass sheet will disintegrate into innumerably small and relatively harmless particles instead of breaking into large dangerous pieces or slivers as is the case with ordinary glass sheets.

In producing bent tempered glass by the above process, the sheets, after being heated to approximately the softening point of the glass and before being suddenly cooled, are subjected to the action of convex and concave bending or mold members which bend or press the softened glass sheet to the desired curvature. The bending and cooling operations are performed in a matter of seconds.

Ordinarily, the glass sheets are suspended in a vertical position during the heating, bending and cooling thereof, and it is customary to hang the sheet from a plurality of relatively small tongs which engage opposite faces of the sheet at diametrically opposite points near its upper edge. The bending or mold members employed are usually of such a size with relation to the glass sheet that during bending the sheet is disposed entirely within the over-all area of the mold members as disclosed in Patent No. 2,270,470, January 20, 1942. In order to suspend the glass sheet in this manner between the mold members, it is necessary that the lower ends of the hooks or tongs be disposed between the upper portions of the molds. To permit the molds to be moved together to effect the bending of the glass sheet without interference from the tongs, the convex and concave surfaces of the molds are provided at their upper ends with opposed recesses or notches for receiving the tongs when the said molds are moved together.

It has been found that glass sheets can be satisfactorily supported by the tongs in this manner when tempering flat sheets or when producing bent tempered glass wherein the sheet is bent so that only the horizontal line elements are curved, while the vertical line elements remain straight. In other words, when the sheet is bent horizontally to produce a simple bend. However, some difficulty has been experienced when the sheet is bent vertically or both horizontally and vertically so that the vertical or both vertical and horizontal line elements are used. In general, when the vertical line elements are bent, the upper edge of the sheet is no longer vertical, so that the tongs, which tend to remain vertical, have a tendency to hold the upper edge portion of the glass sheet straight and to resist bending. This is particularly true in the areas immediately adjacent to the tongs since no bending pressure is applied to the glass sheet at these points because of the notches in the mold members which receive the tongs. This results in the areas of the glass sheet around the tongs being disposed slightly out of the line of curvature of the sheet to form relatively small bulges or protuberances, causing deformation of the upper edge portion of the sheet at these points. Likewise, this stretching of the glass by the tongs causes distortion in the surrounding areas. This undesirable condition has been illustrated in the accompanying drawings and will be more fully hereinafter described.

Generally stated, it is the aim of this invention to minimize, if not entirely eliminate, the above objections inherent in the present method of supporting the glass sheets by the provision of an improved method and means for supporting the said sheets during bending and tempering or, if desired, annealing.

Another important object of the invention is the provision of a method and means for suspending the glass sheet in a vertical position by the use of tongs in such a way as to achieve more uniform and accurate bending of the upper marginal edge portion of the glass sheet and to avoid distortion in the areas of the sheet adjacent the points of support.

Another important object of the invention is the provision of a novel type of tong having glass sheet engaging means arranged to grip the opposite faces of the sheet in such a manner as to urge or assist the bending of the upper edge portions of the sheet adjacent the tongs to conform with those portions engaged by and pressed between the bending molds.

A further important object of the invention is the provision of a novel type of tong in which the glass sheet engaging portions are so arranged with respect to one another that they engage opposite faces of the flat glass sheet to be bent at such points that they will be normal to the faces of the glass sheet after bending or where a line extending between the points of support will be normal to the glass surfaces after bending.

Other objects and advantages of the invention will become more apparent during the course of the following description when taken in connection with the accompanying drawings.

In the drawings, wherein like numerals are employed to designate like parts throughout the same:

Fig. 1 is a vertical sectional view of one form of bending and tempering apparatus illustrating the present invention in use;

Fig. 2 is a plan view of the bending apparatus;

Fig. 3 is a side elevation of one form of improved tong constructed in accordance with this invention;

Fig. 4 is an enlarged view of the sheet engaging portions of the tong looking at right angles to Fig. 3;

Fig. 5 is a detail view of the sheet engaging portions of a modified type of tong also embodying the invention;

Fig. 6 illustrates diagrammatically the principle of supporting the glass sheet in accordance with the present method; and Fig. 7 is an upper edge view, and Fig. 8 a face view of a glass sheet illustrating diagrammatically the objections to the prior method of supporting the sheet.

Referring now to the drawings and particularly to Figs. 1 and 2, the means for heating the glass sheet comprises a furnace designated in its entirety by the numeral 10 while the means for bending the sheet is designated by the numeral 11, and the means for subsequently cooling or chilling the sheet by the numeral 12. The bending apparatus 11 is here shown as being arranged directly above the furnace 10 so that the flat sheet of glass 13, after being heated within the furnace, can be transferred directly to the bending apparatus without undue loss of heat and without being adversely affected by atmospheric conditions during the transfer. The glass sheet 13 is suspended vertically in the furnace from a pair of relatively small hooks or tongs 14 and 15 engaging the sheet near its upper edge and adjacent the opposite edges thereof.

The bending apparatus comprises the horizontally spaced convex and concave bending or mold members 16 and 17 of any preferred width and height and provided with the inner complemental convex and concave bending surfaces 18 and 19 respectively, the curvature of which corresponds to the curvature to be given the glass sheet 13. The mold members 16 and 17 are movable horizontally toward and away from one another and to this end may be carried by horizontal plungers 20 and 21 operating within cylinders 22 and 23 respectively, the horizontal movement of said mold members being controlled in any well known manner by hydraulic or air pressure within said cylinders.

The mold members 16 and 17 are of such size both as to height and width that the glass sheet 13, when brought into position therebetween for bending, is disposed entirely within the area of the mold members; that is to say, the glass sheet does not project beyond the mold members either at the top or bottom or at the opposite ends thereof. In order to suspend the glass sheet in this manner between the mold members, it is of course necessary that the lower ends of the hooks or tongs 14 and 15 be disposed between the upper portions of the mold members. To permit the mold members to be moved together to effect the bending of the glass sheet without interference from said tongs, the convex and concave mold members 16 and 17 are provided at their upper ends with opposed recesses or notches 24—25 respectively for receiving the tong 14 and with similar recesses or notches 26—27 for receiving the tong 15 when the said mold members are moved together.

The cooling means 12 is preferably supported above the bending apparatus for substantially vertical movements so that upon separation of the bending molds 16 and 17 the cooling members 28 and 29 can be positioned adjacent the glass surfaces and removed therefrom rapidly and efficiently. The cooling members 28 and 29 comprise spaced curved blower heads connected by flexible conduits 30 and 31 respectively to suitable blowers so that blasts of air can be directed simultaneously against opposite surfaces of the glass sheet when the blower heads are lowered into position at opposite sides of the sheet 13.

An example of the continuous production of bent tempered glass sheets by this process may be had by reference to Patent No. 2,369,368, February 13, 1945.

The furnace 10 is preferably of the electrically heated type and is provided with a top opening 32 through which the glass sheets 13 to be treated are inserted and removed. For the purpose of heating the furnace, electrical heating elements 33 may be used in conjunction with baffle plates 34 and by means of any conventional indicating and control mechanism the temperature of the furnace can be regulated to heat the glass sheet 13 to approximately its point of softening which is ordinarily in the neighborhood of 1250 degrees Fahrenheit. When the glass sheet has been heated to the desired temperature within the furnace, it is lifted therefrom through the top opening 32 by an overhead hoist including a carrier 36 for the tongs 14 and 15, and subjected immediately to the action of the bending molds 16 and 17 and then to the cooling action of the blower heads 28 and 29 which are lowered to a position at opposite sides of the glass sheet as soon as the bending molds are retracted.

As shown in Figs. 3 and 4, each of the tong 14 and 15 comprises a pair of substantially vertical or upstanding complemental lever members 37 and 38 pivotally connected in overlapping relation adjacent their lower ends by a pivot pin 39. The levers 37 and 38 cross one another at the pivot pin 39 to provide the relatively shorter jaw portions 40 and 41 which are bent laterally so that the lower ends thereof are in alignment with one another as shown in Fig. 4. The jaw portions 40 and 41 are formed at their lower ends with enlarged parts 42 and 43 respectively which carry the sheet gripping elements 44 and 45 comprising screws threaded through said enlarged parts and having smooth rounded inner ends 46 and 47 respectively which engage opposite faces of the glass sheet.

The lever members 37 and 38 are carried by a hanger bracket 48 supported by the horizontal bar 49 of carrier 36. More particularly, there is pivoted to the upper ends of the levers 37 and 38, as at 50 and 51, the links 52 and 53 respectively which are pivoted at 54 to the lower end of a member 55, said member having an upstanding portion 56 carried on a horizontal pintle 57 supported in the trunnions 58 at the lower end of hanger bracket 48. The hanger bracket is preferably substantially C-shaped and provided with a top portion 59 which passes over the top of the bar 49 and through which is threaded an adjusting screw 60 engaging the upper edge of the bar and by means of which the hanger bracket and tong may be adjusted vertically. The open side portion 61 of the hanger bracket is normally closed by a keeper plate 62 removably secured to the bracket as at 63 to guard against accidental displacement of the bracket from the bar.

In order to limit the movement of the jaw portions 40 and 41 of the tong toward one another and thereby prevent the sheet gripping elements 44 and 45 from biting into and unduly marring the glass upon softening thereof, there is carried by one of the lever members 37 or 38 a laterally extending ear or tab 64 through which is threaded a stop screw 65, the inner end of which is adapted to engage an ear 66 on the other lever.

Heretofore, in suspending glass sheets to be bent and, if desired, tempered, by means of tongs, it has been customary to employ tongs in which the sheet engaging elements or screws thereof have gripped the flat sheet of glass at diametrically opposite points and normal to the original sheet surfaces as shown for example in the above Patent No. 2,270,470. While this method is satisfactory when tempering flat sheets of glass or when bending sheets in a horizontal direction to provide a simple bend with only the horizontal line elements curved, it has not proven entirely satisfactory when bending glass sheets vertically or, in other words, in a vertical arc. Thus, when the glass sheet is heated and bent so that the vertical line elements are curved, the sheet supporting tongs tend to restrain the upper edge portions of the sheet from assuming the desired curvature. This is especially true at the points of engagement of the tongs with the sheet due to the fact that the notched molds exert no bending pressure on the sheet at these points.

As illustrated diagrammatically in Fig. 6, the flat sheet of glass to be bent is shown at $a$ and the curved sheet after bending at $b$. Ordinarily, the sheet engaging elements of the tong grip the flat sheet at diametrically opposite points near its upper edge as indicated at $c$ and $d$ so that a line $e$ extending between the two points of support will be horizontal and normal to the surfaces of the flat sheet. However, as pointed out above, upon bending of the glass sheet vertically, there is a tendency for the tongs, because of their fixed relation to the sheet, to resist bending of those portions of the sheet in close proximity thereto, resulting in the formation of bulges or protuberances shown at $f$ in Fig. 7 and which represent portions of the sheet which are not bent with the remainder of the upper edge of the sheet to the desired curvature. The creation of these bulges not only causes deformation of the upper edge of the sheet, but this stretching of the glass at the points of support results in distortion in the areas of the sheet surrounding the points of support which are indicated generally at $g$ in Fig. 8.

We have discovered that the above objections can be greatly minimized, if not entirely eliminated, by supporting the sheet to be bent according to our improved method and by the use of a novel type of tong. Broadly, the method consists in supporting the flat sheet of glass to be bent by tongs having gripping elements which engage the opposite surfaces of the flat sheet in such relation that they will be normal to the surfaces of the glass sheet after bending or in such a way that when the sheet is bent, a line drawn between the points of support will be normal to the curved glass surfaces.

Thus, as shown in Fig. 3, the jaw portion 40 of the tong is relatively shorter than jaw portion 41, and the thickened portions 42 and 43 thereof are so arranged that the screws 44 and 45 threaded therethrough will be vertically offset but in axial alignment with one another at an angle other than a right angle with respect to the sheet 13. The vertical displacement of the screws 44 and 45 and angle thereof are so calculated that the screws will be normal to the curved surfaces of the glass sheet after it is bent. Thus, as shown in Fig. 6, the rounded inner end 47 of screw 45 will engage the glass sheet $a$ at point $h$ while the inner end 46 of screw 44 will engage the sheet at point $c$. When the flat sheet of glass is engaged in this manner, the tongs tend to swing the lower end of the sheet slightly to the left as viewed in Fig. 6. In fact, when the sheet is hung in this way, it does incline slightly to the vertical, tending to force the upper edge of the sheet to the right in the direction it is to be bent.

In determining the location of the points of support for the flat sheet to be bent, a hypothetical line $e$ is first drawn horizontally and transversely through the sheet near its upper edge and perpendicular to its opposite side faces to locate the points $c$ and $d$ normally engaged by the tongs. The curvature to be given the glass sheet is next calculated, after which a hypothetical line $i$ is drawn transversely through the curved sheet and perpendicular to the opposite faces thereof, which line intersects the line $e$ at point $c$ on one face of the original sheet and is spaced vertically at point $h$ from point $d$ on the other face of the sheet. The tongs are then made so that when the glass sheet is suspended therefrom, the inner ends 47 and 46 of screws 45 and 44 engage the flat sheet to be bent at the points $h$ and $c$.

The flat sheet of glass supported in this manner is heated in furnace 10 to the softening point of the glass and then pressed to the desired shape between the bending molds 16 and 17. During the pressing of the sheet between the molds, the tongs will tend to urge the upper edge portions of the sheet which are not engaged by the molds in the direction of bending, and will encourage and assist such bending rather than, as in the past, restrain any bending movement.

If desired, the same results may be obtained by forming the tongs in the manner shown in Fig. 5. In this case the sheet engaging elements or screws 44 and 45 are disposed perpendicular with respect to the opposite surfaces of the flat sheet of glass $a$ to be bent, but are vertically offset to such an extent that when the glass sheet is bent as indicated at $b$, a line $j$ drawn between the points of support 46 and 47 for the sheet will be normal to the surfaces of the bent glass.

From the above, it will be seen that there has been provided an improved method and means for supporting flat sheets of glass to be bent in such a way as to obtain more uniform bending, particularly of those portions of the sheet in close proximity to the points of suspension and which are not engaged by the bending molds. By obtaining more uniform bending, deformation of the upper edge of the sheet is not only prevented but distortion in the sheet resulting from such deformation will also be minimized. When suspending a glass sheet to be bent, the number of tongs used is reduced to a minimum and preferably only two are used, if possible, to allow more mold area to contact the glass and to facilitate bending of the top edge of the sheet.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. The method of bending a flat sheet of glass so that the vertical line elements thereof are curved, which comprises suspending the flat sheet in a vertical position from tongs having sheet contacting elements which engage opposite surfaces of the sheet near its upper edge at points vertically offset from one another so that the upper edge of said sheet is urged in the direction it is to be bent, heating the sheet to bending temperature, and then pressing the heated sheet between mold members having an over-all area relatively greater than that of the flat sheet.

2. The method of bending a flat sheet of glass so that the vertical line elements thereof are curved, which comprises suspending the flat sheet in a vertical position from tongs having sheet contacting elements which engage opposite surfaces of the sheet near its upper edge at points vertically offset from one another so that when the sheet is bent, a line drawn between the points of support will be normal to the curved glass surfaces, heating the sheet to bending temperature, and then pressing the heated sheet between mold members having an over-all area relatively greater than that of the flat sheet.

3. The method of supporting a flat sheet of glass in a vertical position during bending thereof in a vertical direction, which comprises drawing a hypothetical line horizontally and transversely through the flat sheet near its upper edge and perpendicular to the opposite surfaces thereof, next computing the curvature to be given the glass sheet, then drawing a hypothetical line transversely through the curved sheet and normal to the opposite surfaces thereof, which line intersects the first line at the convex face of the sheet to define one point of support and is vertically offset to the first line at the concave face of the sheet to define a second point of support, and hanging the flat sheet from supporting elements engaging opposite surfaces thereof near its upper edge and at the two points of support.

4. The method of supporting a flat sheet of glass in a vertical position during bending thereof in a vertical direction, which comprises suspending the flat sheet from supporting elements engaging opposite surface of the sheet near its upper edge at points vertically offset from one another and wherein the supporting elements will be normal to the surfaces of the glass sheet after bending.

5. The method of supporting a flat sheet of glass in a vertical position during bending thereof in a vertical direction, which comprises suspending the flat sheet by engaging the opposite surfaces thereof near its upper edge with supporting elements which are vertically offset so that when the sheet is bent, a line drawn between the points of support will be normal to the curved glass surfaces.

6. Means for supporting a flat sheet of glass in a vertical position during bending, including gripping elements adapted to engage opposite surfaces of the sheet near its upper edge, said sheet gripping elements being vertically offset with respect to one another to engage the sheet in different horizontal planes.

7. Means for supporting a flat sheet of glass in a vertical position during bending, including gripping elements adapted to engage opposite surfaces of the sheet near its upper edge, said sheet gripping elements being vertically offset and in axial alignment with one another and arranged at an angle other than a right angle with respect to the opposite surfaces of the flat glass sheet.

8. Means for supporting a flat sheet of glass in a vertical position during bending, including jaw portions disposed at opposite sides of the sheet, gripping elements carried by the jaw portions and adapted to engage opposite surfaces of the sheet near its upper edge, said sheet gripping elements being vertically offset with respect to one another to engage the sheet in different horizontal planes.

9. Means for supporting a flat sheet of glass in a vertical position during bending, including jaw portions disposed at opposite sides of the sheet, gripping elements carried by the jaw portions and adapted to engage opposite surfaces of the sheet near its upper edge, said sheet gripping elements being vertically offset and in axial alignment with one another and arranged at an angle other than a right angle with respect to the opposite surfaces of the flat glass sheet.

10. Means for supporting a flat sheet of glass in a vertical position during bending, comprising a pair of jaw portions pivotally connected with one another, adjustable sheet gripping elements including screws threaded through said jaw portions and adapted to engage opposite surfaces of the sheet near its upper edge, said screws being vertically offset to engage opposite surfaces of the sheet in different horizontal planes.

11. Means for supporting a flat sheet of glass in a vertical position during bending, comprising a pair of jaw portions pivotally connected with one another, adjustable sheet gripping elements including screws threaded through said jaw portions and adapted to engage opposite surfaces of the sheet near its upper edge, said screws being vertically offset and in axial alignment with one another and arranged at an angle other than a right angle with respect to the opposite surfaces of the flat glass sheet.

12. Means for supporting a flat sheet of glass in a vertical position during bending, comprising a pair of jaw portions pivotally connected with one another, adjustable sheet gripping elements including screws threaded through said jaw portions and adapted to engage opposite surfaces of the sheet near its upper edge, said screws being horizontally disposed at opposite sides of the sheet and engaging opposite surfaces of the flat sheet in different horizontal planes perpendicular thereto.

13. A tong comprising a pair of upstanding complemental lever members pivotally connected in overlapping relation adjacent their lower ends to provide jaw portions which are laterally bent to align with one another, and gripping elements comprising screws threaded through said jaw portions, said screws being vertically offset and in axial alignment with one another and being disposed at an angle other than a right angle with respect to the vertical.

14. A tong comprising a pair of upstanding complemental lever members pivotally connected in overlapping relation adjacent their lower ends to provide jaw portions which are laterally bent to align with one another, and gripping elements comprising screws threaded through said jaw portions, said screws being horizontally disposed but vertically offset with respect to one another.

GERALD WHITE.
WILLIAM A. SMITH.

REFERENCES CITED

The following references are of record in the file of this patent:

UNITED STATES PATENTS

| Number | Name | Date |
| --- | --- | --- |
| 2,100,512 | Kotowski | Nov. 30, 1937 |